Oct. 26, 1965   J. EVANS   3,213,514
METHOD OF MANUFACTURING CULTIVATING DISCS
FOR AGRICULTURAL IMPLEMENTS
Filed May 22, 1962   2 Sheets-Sheet 1

INVENTOR:
JAMES EVANS
By Paul O. Pippel
ATTORNEY

Oct. 26, 1965  J. EVANS  3,213,514
METHOD OF MANUFACTURING CULTIVATING DISCS
FOR AGRICULTURAL IMPLEMENTS
Filed May 22, 1962  2 Sheets-Sheet 2

INVENTOR:
JAMES EVANS
By Paul O. Pippel
ATTORNEY

United States Patent Office 3,213,514
Patented Oct. 26, 1965

3,213,514
METHOD OF MANUFACTURING CULTIVATING DISCS FOR AGRICULTURAL IMPLEMENTS
James Evans, Geelong, Victoria, Australia, assignor to International Harvester Company, Chicago, Ill., a corporation of New Jersey
Filed May 22, 1962, Ser. No. 196,713
Claims priority, application Australia, July 17, 1961, 7,003/61
9 Claims. (Cl. 29—14)

This invention relates to the manufacture of cultivating discs of the type having a plurality of spaced peripheral notches each defined by an inclined surface which intersects a side of the disc at an acute angle to provide a cutting edge. Usually the discs are of dished form for added rigidity to resist distortion when in use.

There are two principal methods currently employed to produce cultivating discs of this type and both are relatively expensive. In accordance with one known method the notches are first formed by a standard punching operation which produces a straight sided notch. The inclined surface on the notch necessary to form the cutting edge is then produced by a separate milling or grinding operation, and thus two operations are required for each notch.

The other method employed for the production of cultivating discs is that disclosed in Australian Patent No. 161,818 wherein the disc is disposed at a inclination to the line of stroke of the punch so that the punch will form a notch defined by a surface inclined at the surface of the disc. In this manner the cutting edge is produced in the same operation as the notch is formed, but it is only possible to produce one notch at each stroke of the punch.

It is the principal object of the present invention to provide a simple, economical and effective method of forming the notches in cultivating discs of the type herein specified which requires a minimum number of operations and permits the simultaneous production of a number of notches.

With the above stated principal object in view, there is provided according to the present invention a method of forming the notches in cultivating discs of the type herein specified, comprising subjecting a discal blank to a single stroke of a press tool, so as to firstly blank the shape of the notch, and secondly marginally upset or forge the material about the periphery of the notch to form an inclined face which intersects one surface of the blank to impart a cutting edge.

Conveniently the discal blank is heated before being notched so as to reduce the pressure necessary to perform the blanking and upsetting operations. The punch used has a lower parallel section of cross-section corresponding to the profile of the notch and side faces parallel to the axis of the punch, and an upper chamfered section extending outwardly from the upper end of the parallel section. In operation the parallel section engages the disc first and blanks out the notch, and as the axial movement of the punch continues, the chamfer section upsets or forges the periphery of the notch to form a cutting edged at or adjacent the lower face of the disc. A punch of this shape will form a notch having a cutting edge approximately .015" wide.

Thus only one stroke of the press is necessary to form the completed notch, and in a suitably sized machine all notches in a disc can be formed in a single operation. It has not been possible by any of the known methods to previously form completely in a single operation the total number of notches in a cultivating disc, and thus the above method substantially reduces the production time and cost of each disc.

The invention will be more readily understood from the following description of one practical method of producing the cultivating discs, with reference to the accompanying drawings.

Figure 1:
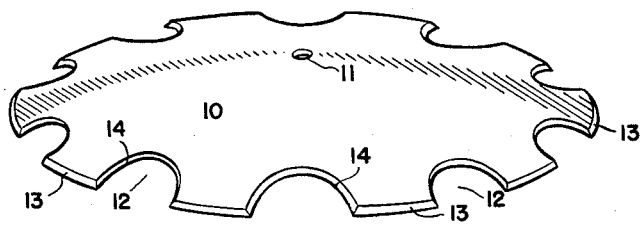
FIG. 1 is a perspective view of the completed cultivator disc.

Referring now to the drawings the finished cultivating disc shown in FIG. 1 is of the type used in the cultivating implements known as disc harrows. The finished disc 10 is of dished form having a central aperture 11 to facilitate mounting of the disc on the implement.

Equally spaced around the periphery of the disc are ten notches 12 each of generally semi-circular shape. The peripheral edge 13 of the disc and the perimeter 14 of each notch is inclined outwardly from the upper convex surface of the disc to form a cutting edge at the lower concave face of the disc. The thickness of the cutting edge measured in a direction perpendicular to the concave face of the disc is normally approximately 0.015 inch.

The complete method of producing the notched cultivator disc 10 illustrated in FIG. 1 will now be described with reference to FIGS. 2 to 8.

Figure 3:
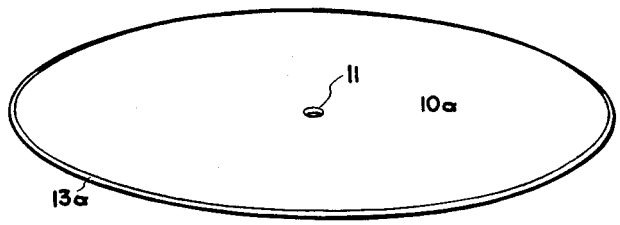
FIG. 3 is a perspective view of the disc prior to blanking the notches.

A flat plain disc with a central aperture 11 is first blanked from a heated steel plate of suitable thickness and properties for subsequent heat treatment. This blank is then mounted in a rolling machine lath or similar machine tool and a chamfer machined onto the periphery thereof to form the cutting edge 13a which will be retained on the portions of the periphery remaining in the finished notched disc. The flat blank 10a with the chamfered periphery is shown in FIG. 3.

The blank 10a is then reheated and placed in a press for the notch forming operation. The following description relates to a press having a die set which will produce the ten notches simultaneously, but it must be understood that the notches can be formed singularly or in groups suitable to the capacity of the press available.

Figure 4:
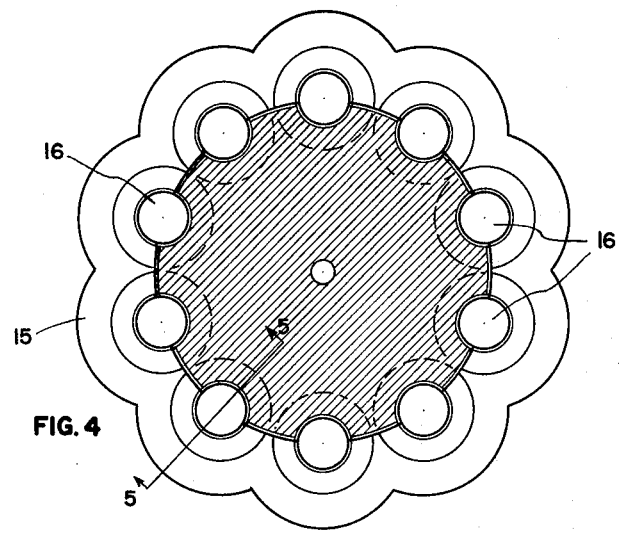
FIG. 4 is a plan view of a die block for producing a ten notch disc, the shaded area representing the disc profile.
Figure 5:
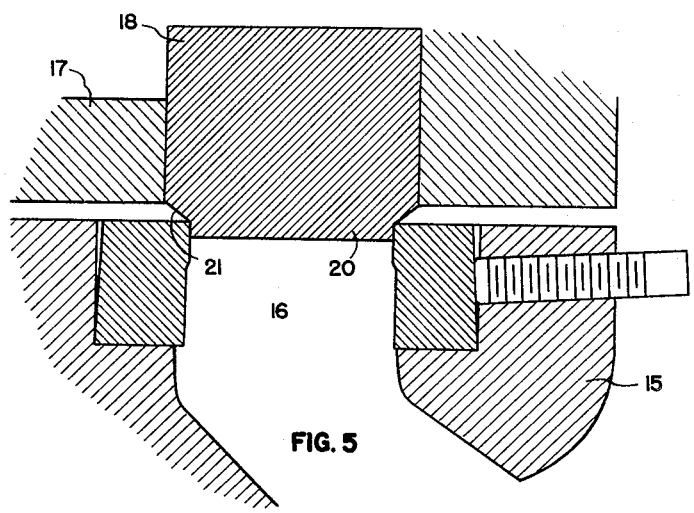
FIG. 5 is a sectional elevation along line 5—5 of FIG. 4.

FIG. 4 illustrates a die block 15 having ten apertures 16 symmetrically arranged with their respective centres on a circle of diameter approximately equal to the diameter of the flat blank 10a. The apertures 16 extend through the die block 15 and are enlarged towards the lower end to permit the free passage of the portion of the blank punched out to form the notch.

Figures 6, 7, 8:
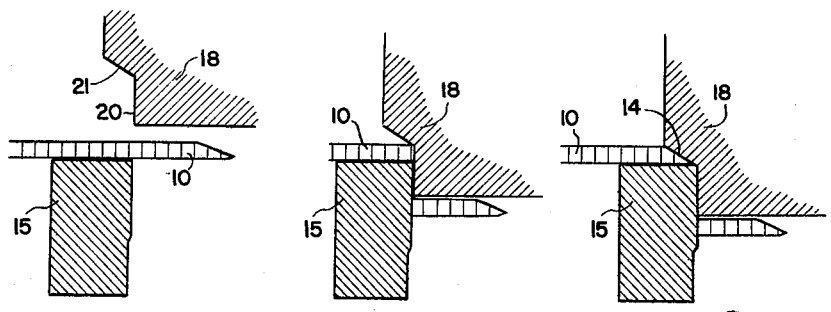
FIGS. 6, 7 and 8 are enlarged views of the die set showing the three phases in forming the notches.

The upper movable section of the press carries ten punch dies 18 each axially slidable in the yieldably mounted pressure plate 17. The ten punch dies 18 are arranged to co-operate with the respective aligning ten apertures 16 in the lower die block 15. Each punch die 18 has a lower cylindrical section 20 which co-operates with and enters the aperture 16 of the die block to blank the notch from the disc blank, as is illustrated in FIGS. 6 and 7.

Extending outwardly from the upper end of the cylindrical section 20 is a tapered section 21 which, upon continuation of the axial movement of the punch, engages the periphery of the newly formed notch and forges a chamfer thereon to form the cutting edge on the notch. During the forming and forging of the notch the disc is maintained flat by the pressure plate 17. In order to reduce the power necessary to form and forge the notches the blank is preferably heated to a temperature of approximately 800° C.

The construction of the press, necessary to first bring the pressure plate 17 into co-operation with the blank disc, and then force the punches 18 through the blank to form and forge the notches is well known to those skilled in the art of press and forge tool design and is not described in this specification.

Figure 2:
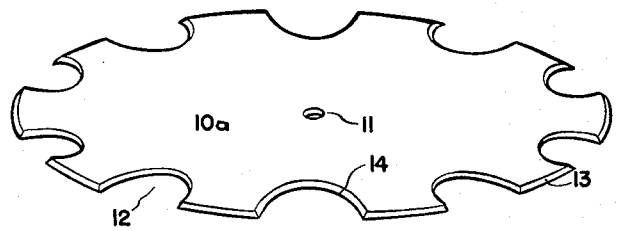
FIG. 2 is a perspective view of the disc after the notches have been formed.

After completion of the punching and forging operation the disc is in the form shown in FIG. 2 comprising a flat disc 10a having ten equally spaced semi-circular notches 12 around its periphery, and a continuous chamfer around the complete perimeter of the disc.

The cultivator disc is the completed by dishing the disc between suitable dies in the known manner and subjecting it to a suitable heat treatment to stress, relieve, toughen and harden the disc to impart to it the desired wear resisting properties.

I claim:

1. A method of forming a metal earth-working disc, comprising the steps of, forming a notch on the periphery of a substantially circular, flat metal blank; and compressing the marginal material outlining the notch to form a cutting edge.

2. A method of forming a metal earth-working disc, comprising the steps of, forming a plurality of circumferentially spaced notches on the periphery of a substantially circular, flat metal blank; and compressing the marginal material outlining the notches to form a plurality of cutting edges.

3. A method of forming a metal earth-working disc, comprising the steps of, forming a substantially semi-circular notch on the periphery of a substantially circular, flat metal blank; and compressing the marginal material outlining the notch to form a substantially semi-circular cutting edge.

4. A method of forming a metal earth-working disc, comprising the steps of, forming a plurality of circumferentially spaced, substantially semi-circular notches on the periphery of a substantially circular, flat metal blank; and compressing the marginal material outlining each respective notch to form a generally semi-circular cutting edge.

5. A method of forming a metal earth-working disc, comprising the steps of, forming a plurality of circumferentially spaced notches on the periphery of a substantially circular, flat metal blank; and compressing the marginal material outlining each notch to form an inclined face intersecting one surface of the metal blank at an acute angle to impart a cutting edge thereto.

6. A method of forming a metal earth-working disc, comprising the steps of forming a plurality of circumferentially spaced, generally semi-circular notches on the periphery of a substantially circular, flat metal blank; and compressing the marginal material outlining each respective notch to form a generally semi-circular, inclined face intersecting one surface of said metal blank at a uniform acute angle to impart a cutting edge thereto.

7. The method of forming a metal earth-working disc, comprising, subjecting a substantially circular, flat metal blank to a single stroke of a shearing and compressing tool so as to, firstly, form a plurality of circumferentially spaced notches on the periphery of the metal blank by shearing the material of the metal blank and, secondly, form a plurality of inclined faces intersecting one surface of the metal blank at a uniform acute angle, said inclined faces being formed by compressing the marginal material outlining each respective notch.

8. A method of forming a metal earth-working disc, comprising the steps of, forming an inclined face on the periphery of a substantially circular, flat metal blank, said inclined face intersecting one surface of the metal blank at a uniform acute angle; and subjecting the flat metal blank to a single stroke of a shearing and compressing tool so as to, firstly, form a plurality of circumferentially spaced notches on the periphery of the metal blank by shearing the material of the metal blank and, secondly, form a plurality of generally semi-circular inclined faces intersecting said one surface of the metal blank at a uniform acute angle, said semi-circular inclined faces being formed by compressing the marginal material outlining each respective notch.

9. A method of forming a metal earth-working disc, comprising the steps of, machining a chamfer on the periphery of a substantially circular, flat steel blank; heating the blank to a temperature of approximately 800° centigrade; and subjecting the blank to a single stroke of a shearing and forging tool so as to firstly, form a plurality of circumferentially spaced, semi-circular notches on the periphery of the blank by shearing the material of the blank in a direction substantially perpendicular to a circular surface thereof and, secondly, form a plurality of semi-circular, inclined faces intersecting one surface of the blank at a uniform acute angle, said semi-circular inclined faces being formed by forging the marginal material outlining each respective notch.

References Cited by the Examiner
UNITED STATES PATENTS

| 1,481,000 | 1/24 | Erickson. | |
| 2,533,756 | 12/50 | Barbknecht | 29—14 |
| 2,705,448 | 4/55 | Ingersoll | 29—148.3 X |
| 2,952,895 | 9/60 | Ingersoll | 29—14 |
| 3,083,440 | 4/63 | Barbknecht et al. | 76—101 X |

WHITMORE A. WILTZ, *Primary Examiner.*